(12) United States Patent
Stratakos et al.

(10) Patent No.: US 7,317,305 B1
(45) Date of Patent: Jan. 8, 2008

(54) METHOD AND APPARATUS FOR MULTI-PHASE DC-DC CONVERTERS USING COUPLED INDUCTORS IN DISCONTINUOUS CONDUCTION MODE

(75) Inventors: Anthony Stratakos, Berkeley, CA (US); Jieli Li, Fremont, CA (US); Biljana Beronja, Mountain View, CA (US); David Lidsky, Oakland, CA (US); Michael McJimsey, Danville, CA (US); Aaron Schultz, San Jose, CA (US); Charles R. Sullivan, West Lebanon, NH (US); Charles Nickel, Easthampton, MA (US)

(73) Assignee: Volterra Semiconductor Corporation, Fremont, CA (US)

( * ) Notice: Subject to any disclaimer, the term of this patent is extended or adjusted under 35 U.S.C. 154(b) by 142 days.

(21) Appl. No.: 11/131,761

(22) Filed: May 18, 2005

(51) Int. Cl.
*G05F 1/40* (2006.01)

(52) U.S. Cl. .................................................... 323/282

(58) Field of Classification Search ................ 323/222, 323/282, 283, 284, 285, 351
See application file for complete search history.

(56) References Cited

U.S. PATENT DOCUMENTS

| | | | | | |
|---|---|---|---|---|---|
| 5,570,276 | A | * | 10/1996 | Cuk et al. | 363/16 |
| 5,999,433 | A | * | 12/1999 | Hua et al. | 363/132 |
| 6,094,035 | A | * | 7/2000 | Smith et al. | 323/222 |
| 6,307,356 | B1 | * | 10/2001 | Dwelley | 323/282 |
| 6,362,986 | B1 | * | 3/2002 | Schultz et al. | 363/132 |
| 6,366,066 | B1 | * | 4/2002 | Wilcox | 323/282 |
| 6,693,411 | B2 | * | 2/2004 | Bub et al. | 323/282 |
| 6,853,562 | B2 | * | 2/2005 | Zhang | 363/21.06 |

* cited by examiner

*Primary Examiner*—Adolf Berhane
(74) *Attorney, Agent, or Firm*—Lathrop & Gage LC

(57) ABSTRACT

A multi-phase, coupled-inductor, DC-DC voltage converter operates in discontinuous conduction mode (DCM) when the system is operated at low output power demand. An embodiment of the converter switches to operating in continuous conduction mode (CCM) when the system is operated at high output power demand. Operation in single-drive and rotating phase DCM operation at low power are described. An alternative embodiment operates in a multiple-drive, rotating-phase, discontinuous conduction mode during at least one condition of output power demand.

24 Claims, 4 Drawing Sheets

METHOD AND APPARATUS FOR MULTI-PHASE DC-DC CONVERTERS USING COUPLED INDUCTORS IN DISCONTINUOUS CONDUCTION MODE

FIELD OF THE INVENTION

The invention relates generally to switching power converters, and particularly to multiphase DC-to-DC converters having coupled inductors.

BACKGROUND OF THE INVENTION

Switching DC-to-DC power converters having a multi-phase coupled inductor topology like that described in U.S. Pat. No. 6,362,986 to Schultz, et al., the disclosure of which is incorporated herein by reference, are known in the art. These converters have advantages, including reduced ripple current in the inductors and switches allowing reduced per-phase inductance or reduced switching frequency, over converters having conventional multi-phase dc-dc converter topologies. Switching DC-to-DC converters as described in U.S. Pat. No. 6,362,986 typically operate in continuous conduction mode (CCM) for high efficiency while driving heavy loads.

Load Variability

DC-DC power converters are often used in applications where the load may vary considerably as a system operates.

For example, the processor of a modern notebook computer may demand tens to more than one hundred amps of current when performing processor-intensive computation at maximum clock rate, while it needs much less current, possibly only a few milliamps, when the system is idle. When a DC-DC converter is designed to power such a processor, the inductors, capacitors, and switching transistors of the converter are typically designed to handle the maximum sustained current required by the processor without overheating.

There are many other applications for power converters where converter load current levels may vary over time. Variation between maximum and minimum load current of factors of hundreds to thousands are not unusual.

Continuous Conduction and Discontinuous Conduction Modes of Operation

Most DC-DC converters that deliver high current operate in Continuous Conduction Mode (CCM). CCM is an operating mode wherein the high and low side switches keep switching on and off alternatively and the current in the output inductor keeps ramping up and down continuously. In CCM in a synchronous DC-DC converter, inductor current never stops flowing, although it may cross through zero. At high current outputs, CCM enables the converter to deliver high current with high efficiency.

In CCM, the inductor carries significant AC current even at low loads. Therefore, there are power losses, such as those due to resistive loss in converter switches and inductor windings, and those due to charging and discharging the parasitic capacitors of the switches, that are present even when the converter operates at low load.

Therefore, with CCM operation, the switching loss and the AC current related loss do not scale down with decreasing load current and they may become a significant part of the total power absorbed by the converter when the load current is small. Since many systems spend considerable portions of their operating lifetime operating at low power levels, they may waste considerable energy over their lifetimes. It is especially important in battery powered systems that DC-DC converters operate at high efficiency over the entire range of possible output power demand to optimize battery life.

Discontinuous conduction mode (DCM) is an operating mode of a DC-DC converter where energy is delivered to the output only when needed. When energy delivery is not required, the switches stop switching and remain off until energy delivery is required. When the switches are off, the current in the inductor remains zero and an output capacitor, the key component of an output filter, supports the output current during the time both switches are off. In this way, switching loss and AC current related loss scale down with decreasing load current and the DC-DC converter maintains high efficiency even at light load.

SUMMARY OF THE INVENTION

A multi-phase, coupled-inductor, DC-DC voltage converter operates in discontinuous conduction mode (DCM) when the system is operated at low output power levels. The converter achieves high efficiency in the described DCM operation at low output power levels.

DETAILED DESCRIPTION OF THE EMBODIMENTS

Figure 1:
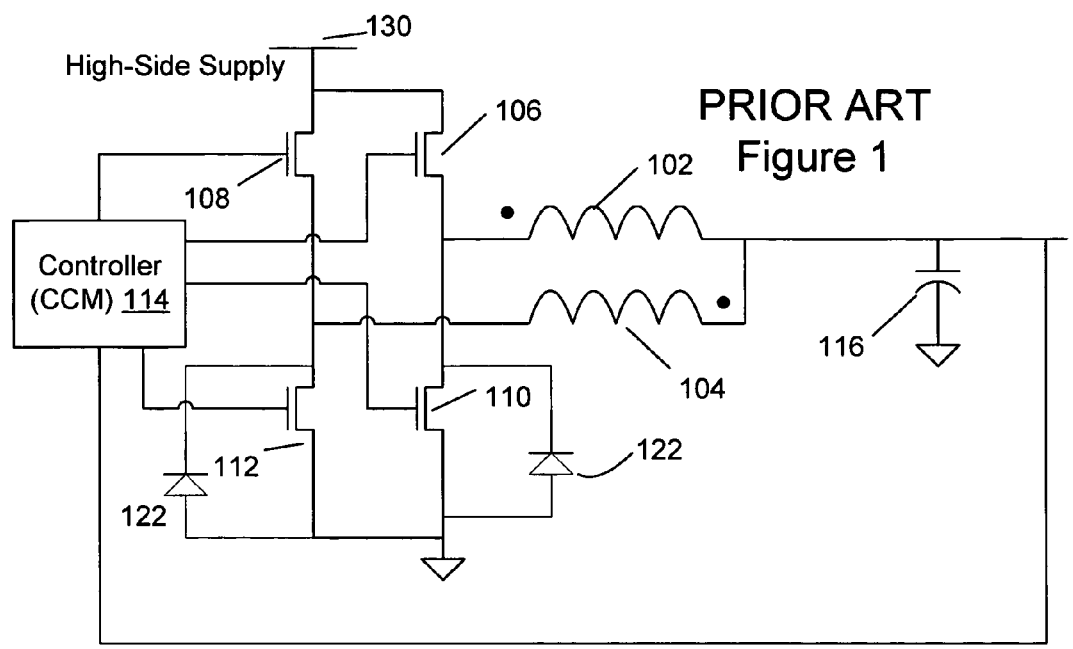
FIG. 1 is an architectural block diagram of a PRIOR-ART 2-phase buck-type, DC-DC voltage converter having coupled inductors.

A two-phase buck-type voltage converter as described in U.S. Pat. No. 6,362,986 to Schultz (FIG. 1) has first 102 and second 104 magnetically coupled inductive windings. This converter has first 106 and second 108 high-side switches, typically implemented as high speed switching transistors, which in an embodiment are P-channel MOS transistors but in alternative embodiments are implemented as N-channel MOS, PNP-bipolar, or NPN-bipolar devices. This converter also has first 110 and second 112 low-side switches, a controller 114, and an output filter having at least one capacitor 116.

The prior-art voltage converter of U.S. Pat. No. 6,362,986 operates in continuous conduction mode (CCM). During CCM operation controller 114 monitors an output voltage at capacitor 116. In periodic steady-state, controller 114 produces pulses by turning on alternately one of the first 106 or second 108 high-side switches, which connect to the high side supply voltage 130, thereby building a current through the associated winding 102 or 104; as this current builds, magnetic coupling also produces a current through the undriven, coupled, of windings 104 or 102, and the associated low-side switch 112 or 110 is turned on such that currents through both windings 102, 104 can charge the filter 116. At the conclusion of this part of the cycle, the associated high-side switch 106 or 108 is turned off and low-side switch 110 or 112 is turned on, such that both low-side switches 110, 112 are on. Winding currents will then decrease, and may reverse. As current decreases, the controller 114 may turn on a different of the high-side switches 108 or 106, while turning off the corresponding low-side switch 112 or 110, thereby building a current through the associated winding 104 or 102; as this current builds, magnetic coupling also produces a current through the now un-driven winding of 102 or 104, and the associated low-side switch 110 or 112 is turned on such that currents through both windings 104, 102 can charge the filter 116. This cycle repeats indefinitely and without pause as the prior converter operates in continuous conduction mode.

There is generally a low-side overshoot diode 122, which is often a parasitic diode component of each low-side switch 110, 112; in non-synchronous converters the low side overshoot diode 122 replaces the low-side switch 110, 112. Since high efficiency at low operating voltages requires that dissipation of power through the forward current voltage drop in diodes be avoided, it is preferable that low-side current be carried through active low-side switches 110, 112; N-channel FET transistors are typically used for this purpose.

Output voltage control in a typical converter is performed by varying the length of time each high-side switch 108, 106 is held on during each energy delivery pulse, as needed to maintain a suitable voltage at filter 116. This can be done using voltage mode control, current mode control, or any other control method known in the art.

Figure 2:
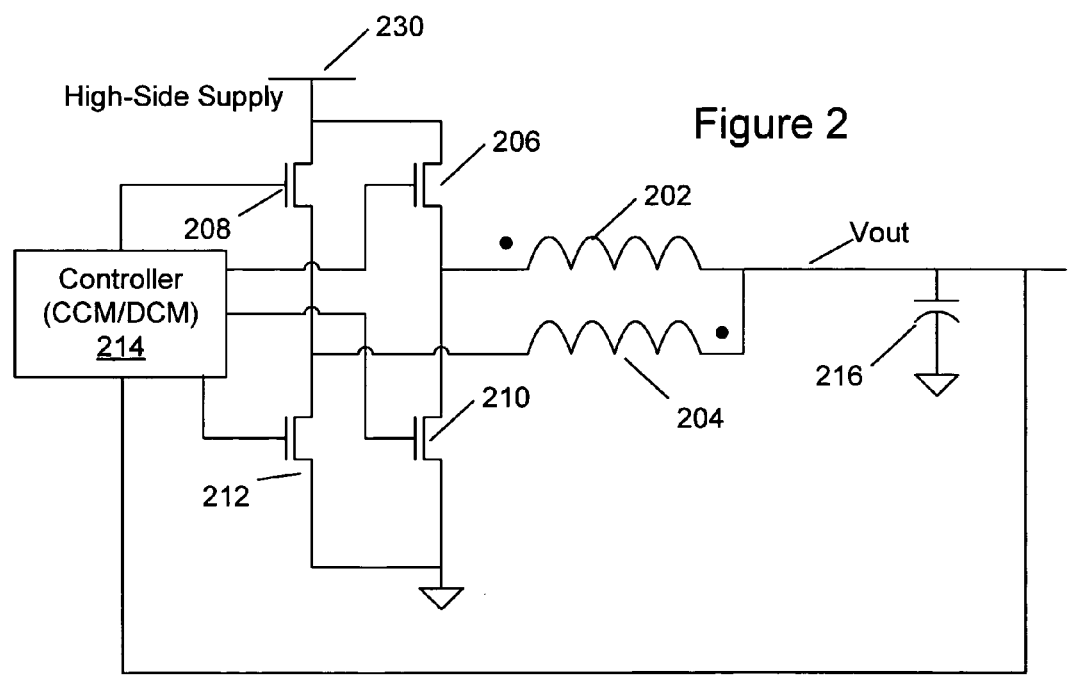
FIG. 2 is an architectural block diagram of a 2-phase buck type DC-DC voltage converter having coupled inductors and Discontinuous Conduction Mode capability.

A two-phase embodiment of the present voltage converter, as illustrated in FIG. 2, has first 202 and second 204 magnetically coupled windings. This converter also has first 206 and second 208 high-side switches, first 210 and second 212 low-side switches, a controller 214, and an output filter having at least one capacitor 216. High-side switches 206, 208 couple windings 202, 204 to high-side input supply 230.

Current sensors or estimators 214 may be provided for monitoring or estimating current in the switches or windings to permit precise control of switching at zero current points.

Figure 3:
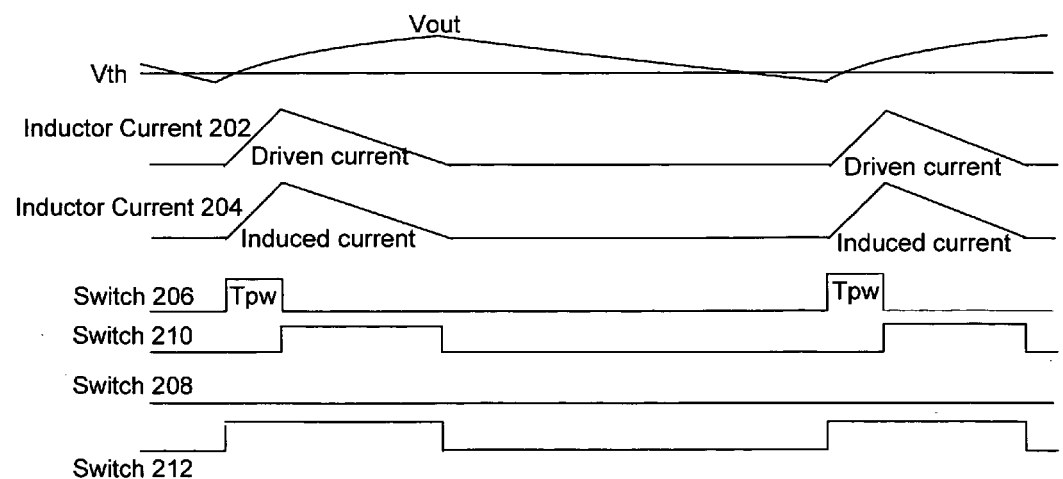
FIG. 3 is a timing diagram illustrating operation of the 2-phase buck converter having coupled inductors in Discontinuous Conduction Mode.

The major difference between present two-phase converter in FIG. 2 and prior art two-phase converter in FIG. 1 is that present converter implements both continuous (CCM) and discontinuous conduction mode (DCM). DCM is particularly important for low output current operation as it greatly reduces switching and AC current related losses at light loads. During single-sided DCM operation, as illustrated in FIG. 3 with reference to FIGS. 2 and 5, the controller 214 monitors 570 voltage Vout at filter 216, testing for that voltage to decay to a voltage below a threshold Vth. When Vout drops below Vth, an energy delivery pulse begins 572. During a first energy delivery pulse, a high-side switch 206 is turned ON, and low-side switch 212 for an inductively coupled opposite phase is turned ON. As current builds in winding 202, a similar current is induced in winding 204.

After high-side switch 206 has been on for a pulse-width Tpw delay 573, the high side switch 206 is turned OFF 574, and the corresponding low side switch 210 is turned ON. After waiting 576 for winding 202, 204 currents to decay and eventually reach zero, low side switches 210, 212 are turned 578 OFF. In an embodiment, the cycle repeats as controller 214 monitors 570 voltage Vout at filter 216, testing for that voltage to decay to a voltage below the threshold Vth.

In an embodiment, pulse-width Tpw is determined by monitoring or estimating a current, such as a current in high side switch 206, low-side switch 212, winding 202, or winding 204, and turning off 574 the high side switch 206, upon the monitored current reaching a predetermined current. In an alternative embodiment, Tpw may also be determined as a preprogrammed time duration. Or it may be controlled by monitoring other signals, or through hysteresis such as by comparing Vout against a second threshold.

In a bit more detail, during each energy delivery pulse, if there were perfect magnetic coupling among windings 202, 204 of both phases, then the current in windings 202, 204 will be identical and will ramp up from zero at a rate of:

$$\frac{di}{dt} = \frac{V_{in} - 2V_{out}}{2L_1}$$

At the end of this energy delivery pulse, Tpw, the current in each winding peaks. The high-side switch 206 then turns OFF and the low-side switch 210 turns ON to pick up the inductive winding current. At that time, the low-side switch 212 in the other phase remains ON. During this interval, the winding currents in both phases have a slope equal to:

$$\frac{di}{dt} = -\frac{V_{out}}{L_1}$$

The low-side switches of both phases are then turned off when their winding current eventually falls to zero.

During the full period in single-sided DCM, the alternate-phase high side switch 208 remains OFF. In practice, the low-side switch is often an NMOS transistor. This scheme has the advantage that only one of the high-side switches is switched per energy delivery pulse, conserving switching energy, while both phases deliver output current.

Figure 4:
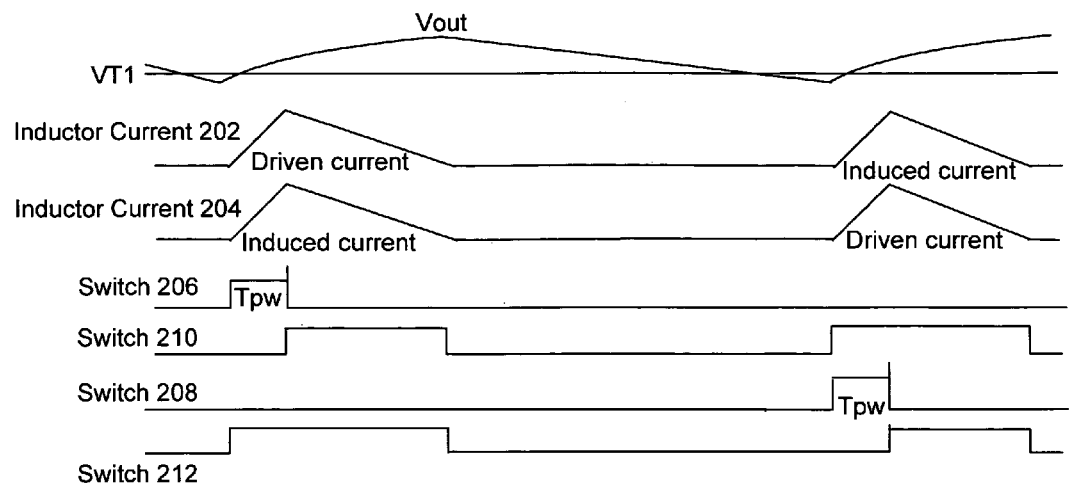
FIG. 4 is a timing diagram illustrating operation of the 2-phase buck converter having coupled inductors in a phase-rotating Discontinuous Conduction Mode.
Figure 6:
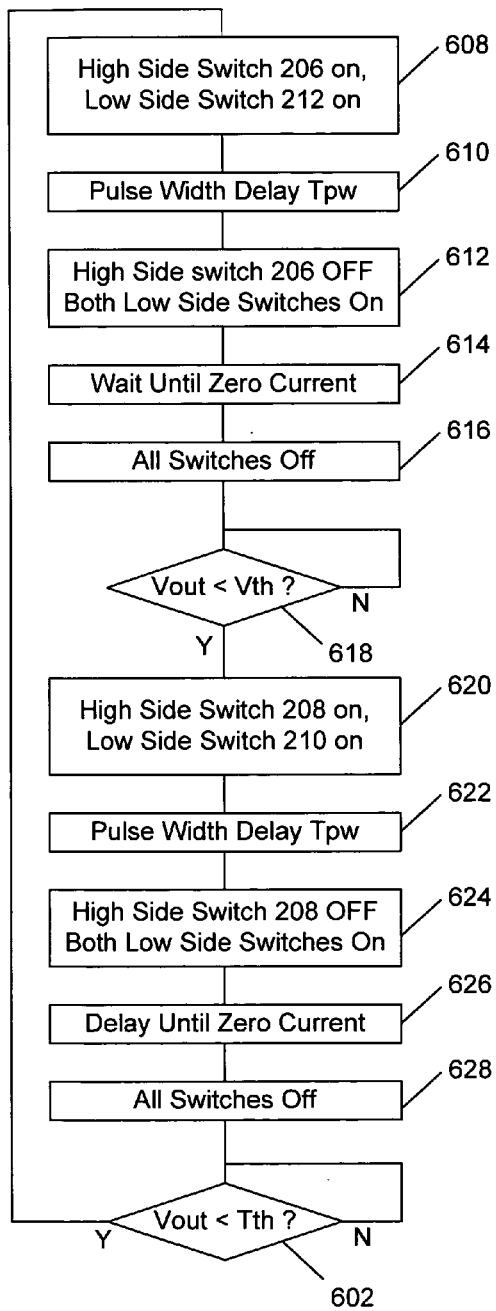
FIG. 6 is an abbreviated flowchart illustrating an alternating-phase method for conserving power in the voltage converter.

For practical DCM implementation with non-ideal coupling between the windings, especially during operation at medium output currents, it may be desirable to operate the system in a phase-alternating DCM mode, as illustrated in FIG. 4 with reference to FIGS. 2 and 6.

Phase-alternating mode is a two-phase example of a phase-rotating DCM mode as hereinafter described. The controller 214 monitors 602 voltage Vout at filter 216, testing for that voltage to decay to a voltage below a threshold Vth. When Vout drops below Vth, a first energy delivery pulse begins 608. During a first energy delivery pulse, a high-side switch 206 is turned ON, and low-side switch 212 for a magnetically coupled opposite phase is turned ON. As current builds in winding 202, a current is induced in winding 204.

After high-side switch 206 has been on for a pulse-width Tpw delay 610, the high side switch 206 is turned OFF 612, and the corresponding low side switch 210 is turned ON. After waiting 614 for winding 202, 204 currents to decay and eventually reach zero, low side switches 210, 212 are turned OFF 616.

The controller 214 continues to monitor 618 voltage Vout at filter 216. When Vout drops below Vth, a second energy delivery pulse begins 620. During a second energy delivery pulse, the alternate phase high-side switch 208 is turned ON, and low-side switch 210 for a magnetically coupled opposite phase is turned ON. As current builds in winding 204, a current is induced in winding 202.

After high-side switch 208 has been on for a pulse-width Tpw delay 622, the high side switch 208 is turned OFF 624, and the corresponding low side switch 212 is turned ON. After waiting 626 for winding 202, 204 currents to decay and eventually reach zero, low side switches 210, 212 are turned OFF 628.

In an embodiment, pulse-width Tpw is determined by monitoring or estimating a current, such as a current in high side switch 206, low side switch 212, high side switch 208, low side switch 210, winding 202, or winding 204, and turning off 612 the high side switch 206, 208 upon the monitored current reaching a predetermined peak current during DCM mode. In an alternative embodiment, Tpw may also be determined as a preprogrammed time duration. Or it may be controlled by monitoring other signals, or through hysteresis such as by comparing Vout against a second threshold.

Once current reaches zero, the cycle repeats and operation continues with the controller 214 monitoring 602 voltage Vout at filter 216, testing for that voltage to decay to a voltage below threshold Vth. When Vout drops below Vth, a next energy delivery pulse begins 608.

In an embodiment, during phase-alternating DCM mode the duration of OFF time between energy delivery pulses is compared against a lower limit L1. If the OFF time is below lower limit L1, indicating operation at high output current, the converter switches to operation in CCM. In an alternative embodiment, output current is directly monitored or estimated and compared to a limit.

Similarly, during CCM operation, output current is monitored or estimated. When the monitored or estimated current is less than a limit L2, the converter switches to operation in DCM.

Figure 5:
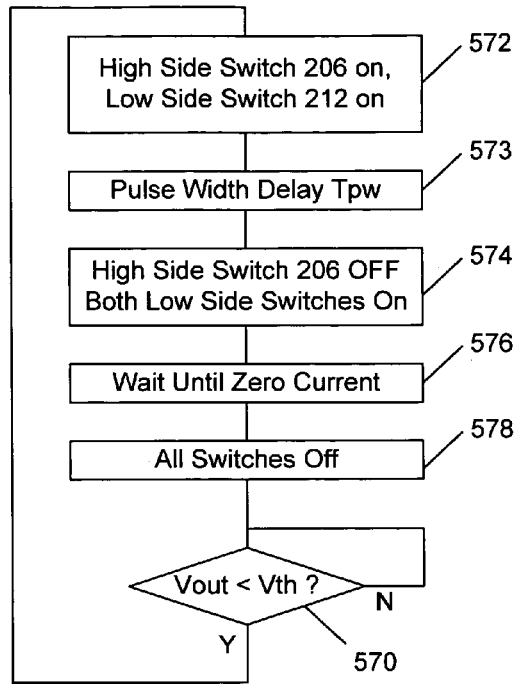
FIG. 5 is an abbreviated flowchart illustrating a single-ended method for conserving power in the voltage converter.

In an alternative embodiment, when the converter operates at very low output currents, operation changes to the single-sided discontinuous conduction mode previously discussed with reference to FIG. 5.

There may be more than two phases in a converter, in context of this document a converter having two or more phases is a multiphase converter.

In a system having more than two phases, in phase-alternating DCM operation, high-side switches are activated in sequence as required for the number of phases in operation. One or more high-side switches can be turned on simultaneously depending on the desired winding current ramp rates. Turnoff of low side switches occurs at or near respective zero-current points and need not be exactly simultaneous.

The system waits with zero current in the inductive windings when the output voltage Vout is greater than threshold, and therefore operates in discontinuous conduction mode.

In an embodiment of the converter, pulse width Tpw is dynamically adjusted based on operating conditions of the converter. In another embodiment, four phases are used, each phase having associated high and low side switches and inductor.

While two phases are illustrated in FIG. 2 for simplicity, the present converter is applicable to converters having more than two phases. For example, an implementation of the present converter having an even number phases with windings magnetically coupled in pairs is illustrated in FIG. 7.

This implementation has a first and a second two-phase converter section 702, 704. Each two-phase converter section 702, 704 is essentially a copy of the circuit illustrated in FIG. 2 less controller 214 and filter 216. These two-phase converter sections each feed a common filter 706 and are controlled by a common controller 708. In this embodiment of a four-phase converter, low power operation in a single-phase DCM mode involves energy delivery pulses generated in a single high-side switch of first converter section 702. Operation in a rotating-phase DCM mode involves energy delivery pulses generated through a first high-side switch of the first converter section 702, then a first high-side switch of the second converter section 704, then a second high-side switch of the first converter section 702, then a second high-side switch of the second converter section 704. The exact sequence of the high-side switches can be modified while still retaining the principle advantages. At high output currents, the four-phase converter operates in CCM.

Figure 7:
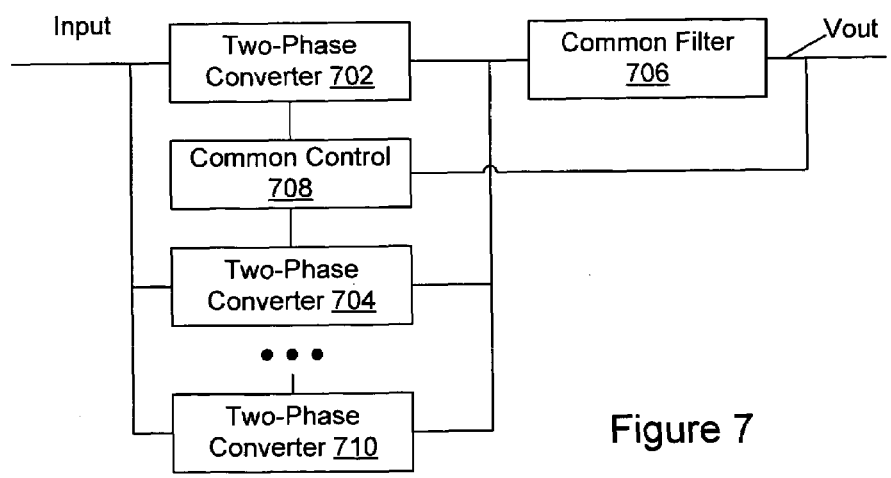
FIG. 7 is an architectural diagram of a DC-DC voltage converter having an even number of phases with coupled inductors.

The four-phase converter of FIG. 7 can be expanded to six or more phases by addition of more two-phase converter sections 710.

Figure 8:
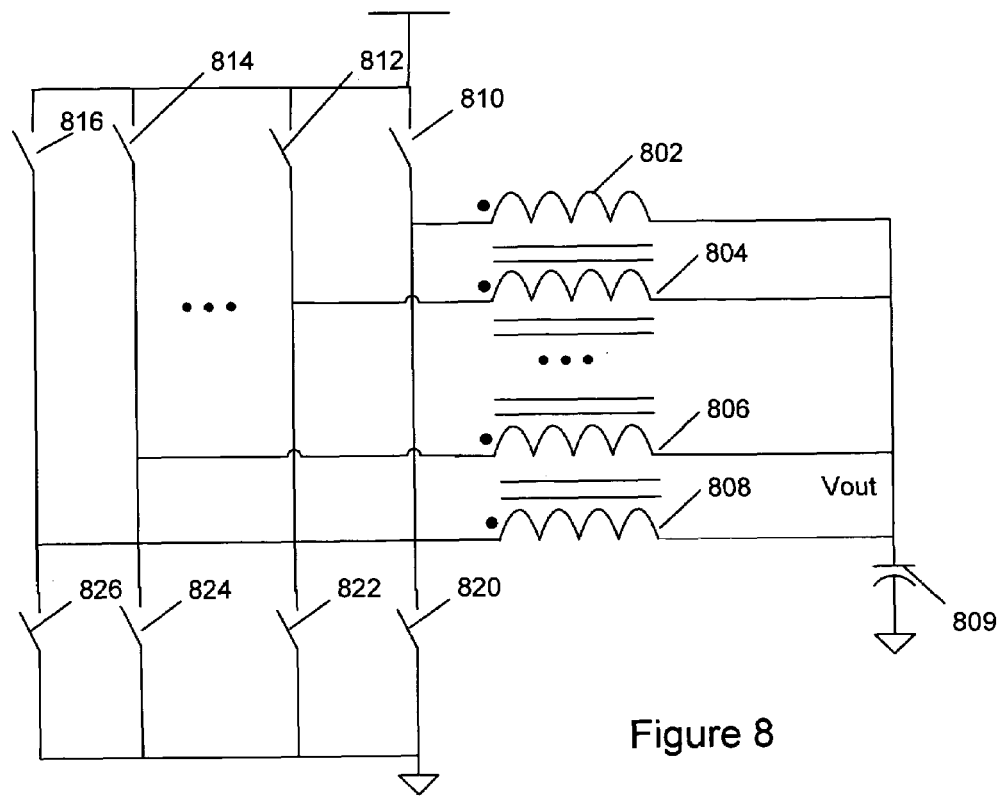
FIG. 8 is an architectural diagram of a DC-DC voltage converter having three or more mutually-coupled inductors.

A more general embodiment of a multiphase converter system having coupled inductors is illustrated in FIG. 8. This embodiment of multiphase converter has multiple magnetically-coupled output inductor windings 802, 804, 806, 808, each connected to drive a common filter 809. Additional mutually coupled output inductor windings may be provided. An implementation having six phases may utilize mutually coupled windings wound on a six-spoke core as illustrated in FIG. 13 of U.S. Pat. No. 6,362,986 to Schultz. The number of phases may be even or odd.

During rotating-phase DCM operation, energy pulses are provided in sequence by high-side switches 810, 812, 814, and 816 to their respective windings 802, 804, 806, and 808 together with any additional high-side switches not illustrated. The sequence pauses whenever Vout is greater than threshold Vth, but continues and repeats whenever Vout is less than threshold Vth. The converter remains in a low-current idle state when Vout is greater than or equal to the threshold. Multiple high-side switches may turn on simultaneously to increase the slew rate of the current in the windings. Each time a high-side switch, such as high side switch 810, turns ON to provide an energy delivery pulse through a driven winding 802, low-side switches 822, 824, and 826 coupled to those other windings 804, 806 that are magnetically coupled to the driven winding are turned ON. Each time an ON high-side switch turns OFF, the associated low-side switch 820 turns ON. The low side switches 820, 822, 824 and 826 then turn OFF when current decays to zero.

In an alternative embodiment of the multiphase converter of FIG. 8, during medium power operation groups of high-side switches are driven in parallel to provide a faster risetime and deliver more energy with each current pulse. In a multiple-drive, rotating-phase DCM with two high-side switches driven in parallel and four coupled windings, a first energy pulse is provided through switches 810 and 814 and windings 802 and 806 while low side switches 822 and 826 are ON permitting coupled windings 804 and 808 to also provide energy to output filter 809 and load.

For purposes of this document, the term "magnetically coupled" with reference to inductors shall mean magnetically coupled windings having a coupling coefficient σ greater than or equal to 3, where $\sigma = L_m/L_1$ as defined in column 8 of U.S. Pat. No. 6,362,986 to Schultz, et al.

It is possible to reference characteristics of the illustrated embodiments with variables. In doing so, let P represent the number of phases in the converter system, where each phase incorporates at least a low-side switch and an output inductor, and typically incorporates a high side switch. Let N represent the number of phases having high side switches. Let C represent the number of phases that are magnetically coupled together. Also, let D represent the number of phases that are driven through high-side switches in a given operating mode of the converter, and of those S phases, let S represent the number of phases driven to the converter input voltage synchronously, with the remaining D-S phases being driven in rotation alternately with the first S phases.

The embodiment of FIG. 2 as discussed above is therefore represented as P=2, C=2, N>=D, N=2, D=1 or D=2, and S=1 system in DCM operation at low currents, and D=2 and S=2 if higher slew rates are desired. Similarly, the embodiment of FIG. 7 can be a P=6, C=2, D<=P, and S<=3 system in DCM operation, and the embodiment of FIG. 8 is a P>=4, C>=4, D<=P, and S<=D system in DCM operation.

It is anticipated that coupled-inductor converters capable of operating in discontinuous conduction mode according to the present document may be built in many configurations such that P>=2, P>=N, P>=C>=2, P>=D, and S <D system in DCM operation.

In particular it is anticipated that D may be less than or equal to N in some low power modes. It is also anticipated that P may be an odd number, as an example a three phase converter embodying these concepts operating with three phases in rotation and having P=3, C=3, N=3, D=3, and S=1 should be practical.

It is also anticipated that an individual converter may have more than one discontinuous conduction operating mode, such as a mode where D=N and a mode where D is less than N, with S<=D, and that the converter may automatically change from a mode with a low D to a mode with a higher D as converter output load or slew rate requirement is increased.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A multiphase voltage converter comprising:
   a first inductor having a first terminal and a second terminal;
   a second inductor having a first terminal and a second terminal, the second inductor magnetically coupled to the first inductor;
   a first high-side switch capable of conducting current from a power source to the first terminal of the first inductor;
   a first low-side switch capable of conducting current from the first terminal of the first inductor to ground;
   a filter comprising at least one capacitor coupled to the second terminal of the first inductor and to the second terminal of the second inductor;
   a second high-side switch capable of conducting current from a power source to the first terminal of the second inductor;
   a second low-side switch capable of conducting current from the first terminal of the second inductor to ground;
   a converter controller for monitoring a voltage at the filter and for determining switch operation in response thereto; and
   wherein the converter operates in a rotating phase discontinuous conduction mode (DCM) during periods of low load, the rotating phase DCM characterized by the first high-side switch and the second high-side switch alternating conduction of current pulses.

2. The multiphase voltage converter of claim 1 wherein the converter operates in continuous conduction mode during periods of high load.

3. A multiphase voltage converter comprising:
   a first inductor having a first terminal and a second terminal;
   a second inductor having a first terminal and a second terminal, the second inductor magnetically coupled to the first inductor;
   a first high-side switch capable of conducting current from a power source to the first terminal of the first inductor;
   a first low-side switch capable of conducting current from the first terminal of the first inductor to ground;
   a filter comprising at least one capacitor coupled to the second terminal of the first inductor and to the second terminal of the second inductor;
   a second high-side switch capable of conducting current from a power source to the first terminal of the second inductor;
   a second low-side switch capable of conducting current from the first terminal of the second inductor to ground;
   a converter controller for monitoring a voltage at the filter and for determining switch operation in response thereto;
   wherein the converter operates in discontinuous conduction mode (DCM) during periods of low load; and
   wherein the first high-side switch conducts current pulses, and the second high-side switch remains quiescent, during periods of low load.

4. The multiphase voltage converter of claim 3 wherein the first and the second high-side switch alternate conduction of current pulses during periods of medium load.

5. A multiphase voltage converter of comprising:
   a first inductor having a first terminal and a second terminal;
   a second inductor having a first terminal and a second terminal, the second inductor magnetically coupled to the first inductor;
   a first high-side switch capable of conducting current from a power source to the first terminal of the first inductor;
   a first low-side switch capable of conducting current from the first terminal of the first inductor to ground;
   a second high-side switch capable of conducting current from a power source to the first terminal of the second inductor;
   a second low-side switch capable of conducting current from the first terminal of the second inductor to ground;
   a third inductor having a first terminal and a second terminal;
   a fourth inductor having a first terminal and a second terminal, the fourth inductor magnetically coupled to the third inductor;
   a third high-side switch capable of conducting current from a power source to the first terminal of the third inductor;
   a third low-side switch capable of conducting current from the first terminal of the third inductor to ground;

a fourth high-side switch capable of conducting current from a power source to the first terminal of the fourth inductor;

a fourth low-side switch capable of conducting current from the first terminal of the fourth inductor to ground;

a filter comprising at least one capacitor coupled to the second terminal of the first inductor, the second terminal of the second inductor, the second terminal of the third inductor, and the second terminal of the fourth inductor;

a converter controller for monitoring a voltage at the filter and for determining switch operation in response thereto;

wherein the converter operates in discontinuous conduction mode during periods of low load; and wherein during periods of medium load, the converter operates in a multiple-drive rotating-phase discontinuous conduction mode wherein the first and third high-side switches conduct current together in a first phase, the second and fourth high-side switches conduct current together in a second phase.

6. The multiphase voltage converter of claim 5 wherein the second inductor is magnetically coupled to the third inductor.

7. The multiphase voltage converter of claim 6 wherein the converter operates in continuous conduction mode during periods of high load.

8. A method of conserving power in a voltage converter, the voltage converter having at least a first and a second inductor driving an output filter, the first and second inductors being magnetically coupled, comprising steps of:

determining an operating characteristic of the voltage converter, the operating characteristic including one of a duration of an off time between energy delivery pulses and an output current of the voltage converter;

determining whether a power demand of a load driven by the voltage converter is high or low by comparing the operating characteristic to a limit;

operating the converter in continuous conduction mode when the power demand is high;

operating the converter in discontinuous conduction mode when the power demand is low.

9. The method of claim 8 wherein the first inductor is driven by circuitry comprising a first high-side switch and the second inductor is driven by circuitry comprising a second high-side switch, and wherein the first high-side switch and the second high-side switch alternate conduction of current pulses when the power demand is low.

10. The method of claim 8 wherein the first inductor is driven by a first high-side switch and the second inductor is driven by a second high-side switch; and wherein the first high-side switch conducts current pulses, and the second high-side switch remains quiescent, when the power demand is low.

11. The method of claim 10 wherein the first and the second high-side switch alternate conduction of current pulses when the power demand is medium.

12. A voltage converter comprising:

a first inductor magnetically coupled to a second inductor, wherein a first terminal of the first inductor and a first terminal of the second inductor are coupled to an output capacitor and to an output of the voltage converter;

means for driving a second terminal of the first inductor through a cycle comprising a high voltage state, a low voltage state, a high impedance state, a second low voltage state and a second high impedance state; and means for driving a second terminal of the second inductor through a cycle comprising a low voltage state, a high impedance state, a first high voltage state, a second low voltage state, and a second high impedance state.

13. The voltage converter of claim 12 wherein the means for driving a second terminal of the first inductor through a cycle is capable of operating through a cycle comprising a high voltage state and a low voltage state without high impedance states when the converter operates at high output currents.

14. The voltage converter of claim 12 further comprising:

a third inductor magnetically coupled to a fourth inductor, wherein a first terminal of the third inductor and a first terminal of the fourth inductor are coupled to the output capacitor and to the output of the voltage converter;

means for driving a second terminal of the third inductor through a cycle comprising a low voltage state, and a high impedance state; and means for driving a second terminal of the fourth inductor through a cycle comprising a low voltage state, and a high impedance state.

15. A two-phase voltage converter comprising:

a first inductor having a first terminal and a second terminal;

a second inductor having a first terminal and a second terminal, the second inductor magnetically coupled to the first inductor;

a first high-side switch capable of conducting current from a power source to the first terminal of the first inductor;

a first low-side switch capable of conducting current from the first terminal of the first inductor to ground;

a filter comprising at least one capacitor coupled to the second terminal of the first inductor and to the second terminal of the second inductor;

a second high-side switch capable of conducting current from a power source to the first terminal of the second inductor;

a second low-side switch capable of conducting current from the first terminal of the second inductor to ground;

a converter controller for monitoring a voltage at the filter and for determining switch operation in response thereto;

wherein the converter operates in discontinuous conduction mode during periods of low load, and wherein the first high-side switch and the second high-side switch alternate conduction of current pulses during periods of low load.

16. A two-phase voltage converter of comprising:

a first inductor having a first terminal and a second terminal;

a second inductor having a first terminal and a second terminal, the second inductor magnetically coupled to the first inductor;

a first high-side switch capable of conducting current from a power source to the first terminal of the first inductor;

a first low-side switch capable of conducting current from the first terminal of the first inductor to ground;

a filter comprising at least one capacitor coupled to the second terminal of the first inductor and to the second terminal of the second inductor;

a second high-side switch capable of conducting current from a power source to the first terminal of the second inductor;

a second low-side switch capable of conducting current from the first terminal of the second inductor to ground;

a converter controller for monitoring a voltage at the filter and for determining switch operation in response thereto;

wherein the converter operates in discontinuous conduction mode during periods of low load; and wherein the first high-side switch conducts current pulses, and the second high-side switch remains quiescent, during periods of low load; and wherein the first and the second high-side switch alternate conduction of current pulses during periods of high load.

17. A multiphase voltage converter comprising:

a number P of phases, P greater than or equal to two, where each phase comprises an inductor having a first terminal and a second terminal, and a low-side switch capable of conducting current from the first terminal of the inductor to ground;

an output filter for receiving energy from the second terminal of the inductor of each phase and for driving an output of the converter;

a converter controller for monitoring a voltage at the output filter and for determining switch operation in response thereto;

wherein a number N of the P phases, N less than or equal to P, further comprise a high side switch for driving the first terminal of the inductor of the phase to a converter input voltage;

wherein a number C of the inductors of the phases are magnetically coupled to each other, C less than or equal to P, and C greater than or equal to 2;

wherein the converter operates in a discontinuous conduction mode (DCM) at low output currents, and wherein the converter operates in a continuous conduction mode (CCM) at high output currents;

wherein a number S of the P inductors of the phases are driven to the converter input voltage simultaneously when the converter operates in the DCM, S greater than or equal to one; and wherein the converter operates with a number D of the P inductors of the phases being driven to the converter input voltage during operation in the DCM, D less than P.

18. The multiphase converter of claim 17 wherein P equals 2, N equals 2, C equals 2, and S equals 1, and where D equals 1.

19. The multiphase converter of claim 17 wherein P equals 4, C is selected from the group consisting of 2 and 4, and S is selected from the group consisting of 1 and 2.

20. The multiphase converter of claim 17 wherein P equals C, and wherein C is greater than 2.

21. The multiphase converter of claim 17 wherein P is greater than or equal to 4, and C is equal to P.

22. The multiphase converter of claim 17 wherein D is greater than S.

23. The multiphase converter of claim 17 wherein D and S are both one, and wherein P is greater than or equal to three.

24. A multiphase voltage converter comprising:

a first inductor having a first terminal and a second terminal;

a second inductor having a first terminal and a second terminal, the second inductor magnetically coupled to the first inductor;

a first high-side switch capable of conducting current from a power source to the first terminal of the first inductor;

a first low-side switch capable of conducting current from the first terminal of the first inductor to ground;

a filter comprising at least one capacitor coupled to the second terminal of the first inductor and to the second terminal of the second inductor;

a second high-side switch capable of conducting current from a power source to the first terminal of the second inductor;

a second low-side switch capable of conducting current from the first terminal of the second inductor to ground; and a converter controller for monitoring a voltage at the filter and for determining switch operation in response thereto, the converter controller operable to determine whether a load of the converter is high or low by comparing one of a duration of an off time between energy delivery pulses and an output current of the converter to a limit;

wherein the converter operates in a discontinuous conduction mode during periods of low load, and wherein the converter operates in continuous conduction mode during periods of high load.

* * * * *